(12) United States Patent
Cao et al.

(10) Patent No.: US 11,493,333 B2
(45) Date of Patent: Nov. 8, 2022

(54) FLATNESS DETECTION DEVICE

(71) Applicant: SHANGHAI FUSION TECH CO., LTD., Shanghai (CN)

(72) Inventors: Xi Cao, Shanghai (CN); Hua Feng, Shanghai (CN); Jianzhe Li, Shanghai (CN); Jinjing Zhang, Shanghai (CN); Wangping Long, Shanghai (CN); Xiaoyu Wu, Shanghai (CN); Zhongwei Yu, Shanghai (CN); Xingpeng Fan, Shanghai (CN); Rui Yuan, Shanghai (CN); Huan Liu, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 415 days.

(21) Appl. No.: 16/801,408

(22) Filed: Feb. 26, 2020

(65) Prior Publication Data

US 2021/0172734 A1 Jun. 10, 2021

(30) Foreign Application Priority Data

Dec. 6, 2019 (CN) .......................... 201911254174.X
Dec. 25, 2019 (CN) .......................... 201911354742.3
Dec. 25, 2019 (CN) .......................... 201922360846.7

(51) Int. Cl.
*G01B 11/30* (2006.01)
*B29C 64/393* (2017.01)
*B29C 64/245* (2017.01)

(52) U.S. Cl.
CPC .......... *G01B 11/306* (2013.01); *B29C 64/245* (2017.08); *B29C 64/393* (2017.08); *G01B 11/303* (2013.01)

(58) Field of Classification Search
CPC .... G01B 11/306; G01B 11/303; G01B 5/285; B29C 64/245; B29C 64/393; B29C 64/386; B33Y 50/00
USPC .................................................. 356/601–624
See application file for complete search history.

(56) References Cited

U.S. PATENT DOCUMENTS

| 4,230,038 | A | * | 10/1980 | Hebert | ........................ | B41J 2/24 |
| | | | | | | 400/124.11 |
| 9,278,474 | B1 | * | 3/2016 | Chang | ..................... | B33Y 30/00 |
| 10,514,678 | B2 | * | 12/2019 | Share | ..................... | B33Y 30/00 |
| 2011/0174950 | A1 | * | 7/2011 | Lee | ......................... | B41J 2/1752 |
| | | | | | | 248/310 |

(Continued)

FOREIGN PATENT DOCUMENTS

| CN | 109501260 A | 3/2019 |
| CN | 110091805 A | 8/2019 |

(Continued)

*Primary Examiner* — Isiaka O Akanbi
(74) *Attorney, Agent, or Firm* — Avek IP, LLC

(57) ABSTRACT

Some embodiments of the disclosure provide a flatness detection device. In an embodiment, the flatness detection device includes a back plate, an electromagnet, a cross beam, a probe, and a limiting frame. The limiting frame and the electromagnet are provided side by side on the back plate. The cross beam is located above the limiting frame and the electromagnet. The probe vertically penetrates the cross beam and the limiting frame. A spring is provided between the cross beam and the electromagnet. The spring is movable in a vertical direction by a guide, the movement being at least one of compression and extension.

8 Claims, 4 Drawing Sheets

(56) References Cited

U.S. PATENT DOCUMENTS

| | | | | |
|---|---|---|---|---|
| 2015/0130100 A1* | 5/2015 | Fiegener | ............... | B29C 64/118 |
| | | | | 425/150 |
| 2020/0070419 A1* | 3/2020 | Ni | ........................ | B29C 64/393 |
| 2020/0247050 A1* | 8/2020 | Mehta | .................... | B33Y 30/00 |

FOREIGN PATENT DOCUMENTS

| | | |
|---|---|---|
| CN | 209426174 U | 9/2019 |
| CN | 110481012 A | 11/2019 |
| CN | 209616360 U | 11/2019 |
| CN | 209738285 U | 12/2019 |
| CN | 210026312 U | 2/2020 |
| CN | 110948879 A | 4/2020 |

* cited by examiner

FLATNESS DETECTION DEVICE

CROSS REFERENCE TO RELATED APPLICATIONS

This application claims priority to Chinese application number 20191135474-2.3 filed on Dec. 25, 2019 and Chinese application number 201922360846.7 filed on Dec. 25, 2019, both of which claim priority to Chinese application number 201911254174.X filed on Dec. 6, 2019, the disclosure of which are incorporated by reference herein in their entireties.

FIELD OF THE DISCLOSURE

The disclosure relates generally to the field of flatness detection. More specifically, the disclosure relates a flatness detection device of a 3D printer.

BACKGROUND

The printing effect of a 3D printing device is very dependent on the flatness of a printing substrate. The flatness of the printing substrate largely determines whether the printing is successful. Software correction requires an extremely accurate detection method. The precision of the existing mechanical touch sensors in the market cannot meet the increasingly demanding customer needs. An active platform is self-leveling and is rarely used by printer manufacturers because the cost is high and it is difficult to achieve.

Other mechanisms on the market are in the storage state with the electromagnet working all the time, retracting the probe against the force of the spring, which will generate noise, adversely affect the life of the machine and the spring, and affect the precision and reliability after long-term work.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a flatness detection device. The device includes a back plate, an electromagnet, a cross beam, a probe, and a limiting frame. The limiting frame and the electromagnet are provided side by side on the back plate. The cross beam is located above the limiting frame and the electromagnet. The probe vertically penetrates the cross beam and the limiting frame. A spring is provided between the cross beam and the electromagnet. The spring is movable in a vertical direction by a guide, the movement being at least one of compression and extension.

Optionally, a circuit board is provided between the limiting frame, the electromagnet, and the back plate. And a controller is connected to the circuit board.

Optionally, a photoelectric sensor is provided on the circuit board, a light through-hole is provided on the probe. A light of the photoelectric sensor is configured to pass through the light through-hole. The photoelectric sensor and the electromagnet are electrically connected to the controller, respectively.

Optionally, a groove is provided in the middle and upper part of the limiting frame, and the photoelectric sensor is located in the groove.

Optionally, a sliding groove is provided on a lower end of the probe. A bolt is provided below the limiting frame, and the bolt is slidable in the sliding groove.

Optionally, the back plate is constructed of sheet metal. The sheet metal is recessed in a middle area and is provided with the limiting frame and the electromagnet. The limiting frame and the electromagnet are fixedly connected by bolts. And connection holes are provided on opposed sides of the sheet metal.

Optionally, the guide is a screw, and the screw penetrates the cross beam, the spring, and the electromagnet.

Optionally, the cross beam and the limiting frame are connected by a positioning pin.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

Figure 1:
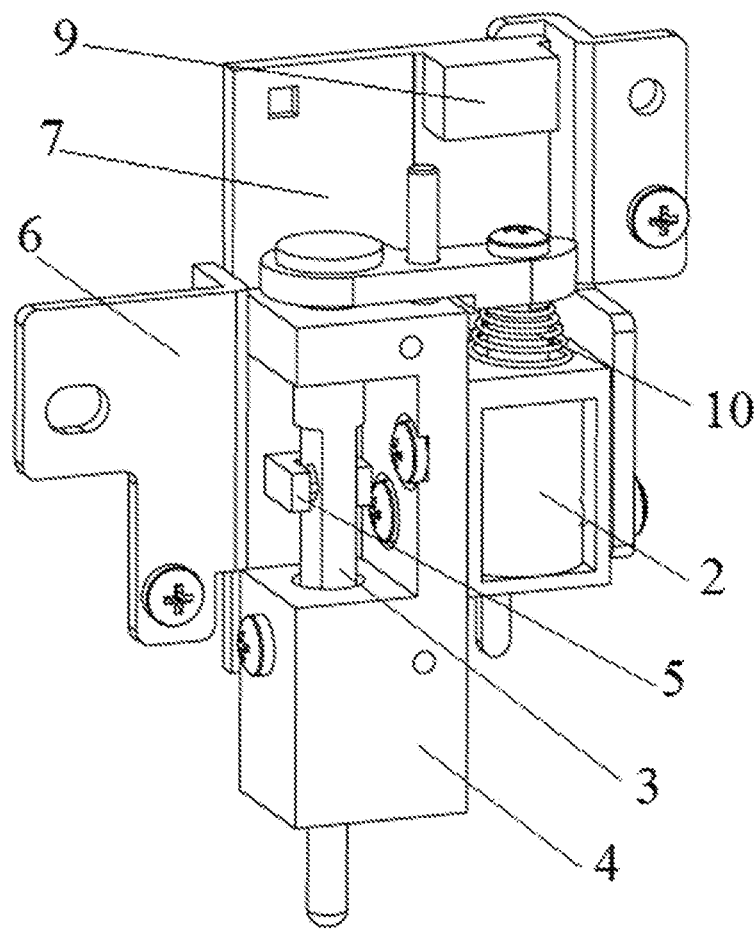
FIG. 1 is a schematic diagram illustrating a structure of a flatness detection device according to an embodiment of the disclosure.
Figure 2:
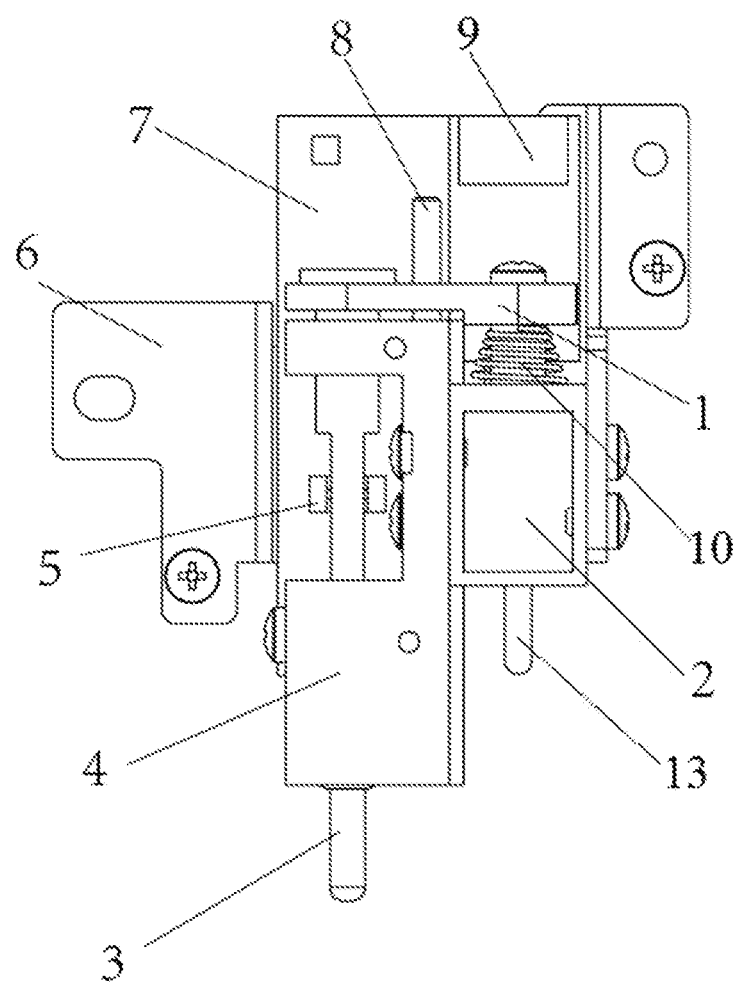
FIG. 2 is a schematic diagram illustrating a structure of a flatness detection device during a detection according to an embodiment of the disclosure.
Figure 3:
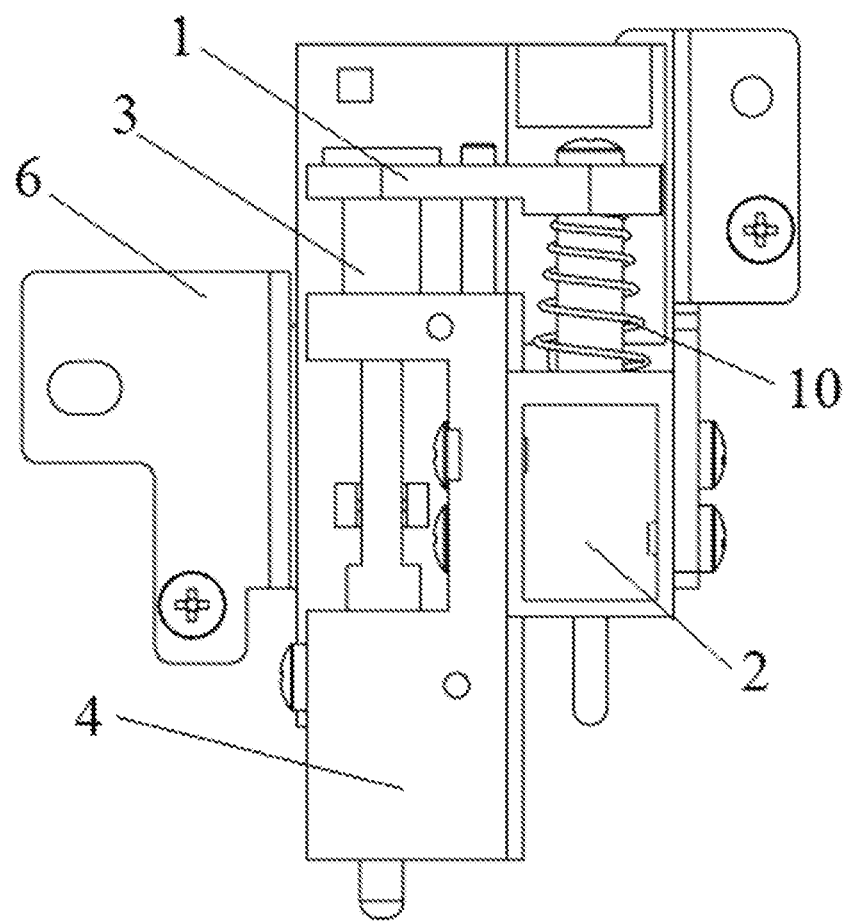
FIG. 3 is a schematic diagram illustrating a structure of a flatness detection device during a resetting according to an embodiment of the disclosure when reset.
Figure 4:
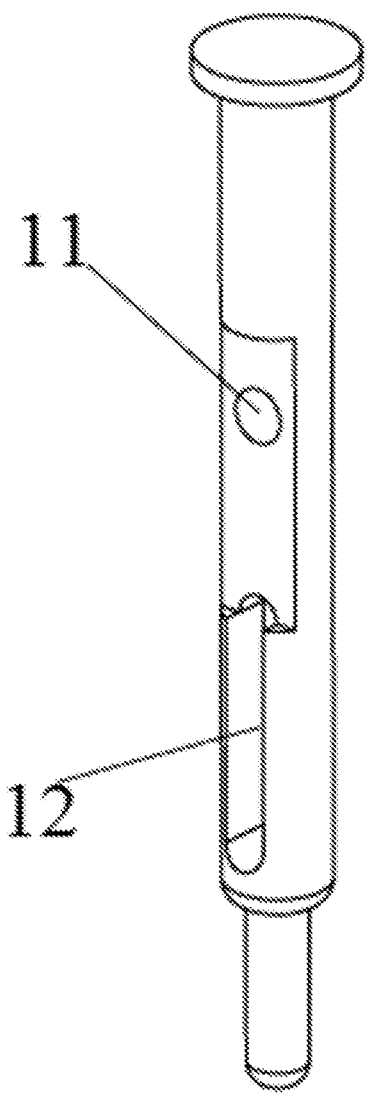
FIG. 4 is a schematic diagram illustrating a structure of a probe in a flatness detection device according to an embodiment of the disclosure.

The disclosure is further described in detail below with reference to the accompanying drawings and the specific embodiments. In FIGS. 1-4, 1 represents a cross beam, 2 represents an electromagnet, 3 represents a probe, 4 represents a limit frame, 5 represents a photoelectric sensor, 6 represents a back plate, 7 represents a circuit board, 8 represents a positioning pin, 9 represents a data wiring board, 10 represents a spring, 11 represents a light through represents hole, 12 represents a sliding groove, and 13 represents a screw.

As shown in FIGS. 1-4, the disclosure provides a flatness detection device. The device may include a back plate 6, an electromagnet 2, a cross beam 1, a probe 3, and a limiting frame 4. The limiting frame 4 and the electromagnet 2 are provided side by side on the back plate 6. The cross beam 1 is located above the limiting frame 4 and the electromagnet 2. The probe 3 vertically penetrates the cross beam 1 and the limiting frame 4. A spring 10 is provided between the cross beam 1 and the electromagnet 2. The spring 10 is compressible or stretchable in a vertical direction by a guide. Optionally, the spring 10 is both compressible and stretchable in a vertical direction by a guide. The back plate 6 is a sheet metal. The sheet metal is recessed in a middle area and is provided with the limiting frame 4 and the electromagnet 2. The limiting frame 4 and the electromagnet 2 are fixedly connected by bolts, and connection holes are provided on opposed sides of the sheet metal. The guide is a screw 13, and the screw penetrates the cross beam 1, the spring 10, and the electromagnet 2. The screw may limit the vertical movement of the electromagnet 2. The probe 3 may also be fixed on the cross beam 1.

A circuit board 7 is provided between the limiting frame 4, the electromagnet 2, and the back plate 6. A controller 9 is connected to the circuit board 7 through a data wiring board 9. A photoelectric sensor 5 is provided on the circuit board 7. A light through-hole 11 is provided on the probe 3. A light of the photoelectric sensor 5 in configured to pass through the light through-hole 11. The photoelectric sensor 5 and the electromagnet 2 are electrically connected to the controller 9, respectively. A groove is provided in the middle and upper part of the limiting frame 4, and the photoelectric sensor 5 is located in the groove. Two ends of the photoelectric sensor 5 are located on two respective sides of the probe 3 without direct contact. During the entire detection process, the sensor 5 and the probe 3 have no mechanical wear or noise, which may help to keep the detection process quiet. This embodiment thus may improve the service life and the reliability of the probe 3.

The cross beam 1 and the limiting frame 4 are connected by a positioning pin 7 for limiting the moving direction of the cross beam 1. A sliding groove 12 is provided on a lower end of the probe 3. A bolt is provided below the limiting frame 4, and the bolt is slidable in the sliding groove 12. In this embodiment, the movement direction of the probe 3 is limited by the positioning pin 7 and the sliding groove 12, so that the precision of the axial displacement of the probe 3 may be improved, and the positioning precision may reach 6 to 10 μm.

In other embodiments, the disclosure may be used as a part of a 3D printer. The working process and the flatness detection principle are described as follows.

Before printing starts, the controller of the printer controls the electromagnet 2 to be energized. The electromagnet 2 and the cross beam 1 are attracted to move the probe 3 downward to the lowest point and perform flatness detection at any number of points. After the flatness detection is completed, the electromagnet 2 works instantaneously so that the cross beam 1 rises, driving the probe 3 to rise and maintaining the cross beam 1 against the elastic force of the spring 10. The probe 3 is thus maintained at a high position without interfering the printing process.

When the detection is started, the controller of the printer sends motor pulses at specific intervals to control the detection device to descend. When the light through-hole 11 on the probe 3 moves to the middle of the photoelectric sensor 5, the signal of the photoelectric sensor 5 may be successfully transmitted, that is, the photoelectric sensor 5 is triggered once. When the probe 3 continues to move downward to be in contact with the detection plane, the light through-hole 11 of the probe 3 is pushed away from the sensing area of the photoelectric sensor, and it will immediately send a signal to the controller and record the number of pulses that have been activated. Similarly, when the probe 3 moves upward after being in contact with the detection plane, and when the light through-hole 11 of the probe 3 moves to the middle of the photoelectric sensor 5, the photoelectric sensor 5 will send a signal to the controller and record the number of pulses that have been activated at this time. In this way, the reciprocating displacement of the probe 3 in triggering the photoelectric sensor 5 twice may be calculated during a reciprocating movement. And this calculated reciprocating displacement of the probe 3 may be converted into the displacement that has been moved in the Z axis. Thus, the height detection of a plurality of flatness detection points may be performed in accordance with the set program in turn, and then the flatness of the entire plane may be calculated. In some embodiments, the height of the first detection point is recorded and is used both as the flatness zero reference and parameters for other applications. In other embodiments, the height of the first detection point is not recorded and is only used as the flatness zero reference. The subsequent detection may be compared with this reference point in terms of relative height. The following shows an example of this application.

Assuming that A is the reference zero point, and the distance corresponding to each motor motion pulse is 0.01 mm, the heights of point B and point C are measured as follows.

The controller sends one hundred motor pulses at 0.01 s interval to control the entire device to move upward; that is, the probe moves to 1 mm above point A. The entire device is translated above point B, and the controller sends two hundred motor pulses at 0.01 s interval to control the entire device to move downward until the probe triggers the signal. When fifty pulses are triggered and recorded when being sent, the height of this area is +0.5 mm relative to the reference point A. The controller sends fifty motor pulses at 0.01 s interval to control the entire device to move upward, and the probe moves to 0.5 mm above point B (i.e., 1 mm above point A). The entire device is translated above point C, and the controller sends two hundred motor pulses at 0.01 s interval to control the entire device to move downward until the probe triggers the signal. When one hundred and twenty pulses are triggered and recorded when being sent, the height of this area is −0.2 mm relative to the reference point A. In this example, the detection results are A=0 mm, B=+0.5 mm, and C=−0.2 mm.

Similarly, the grid height of the entire plane may be established, and then the flatness of the entire plane may be calculated. When more and denser points are taken, the actual situation of the flatness may be reflected more accurately.

The flatness detection device of the disclosure may complete the flatness detection of various bottom plates with high precision and low energy consumption, and may be particularly applicable to various numerical control devices such as 3D printers. The storage state of the probe 3 in the present embodiment is maintained, which does not consume power, has no noise or heat, and has no electromagnetic interference on the printer.

Various embodiments of the disclosure may have one or more of the following effects. The flatness detection device may complete the flatness detection of various bottom plates with high precision, low energy consumption, and high reliability. The flatness detection device may be particularly applicable to various numerical control devices such as 3D printers, and may complete the detection with high precision. The storage state of the probe may be maintained and does not consume power. The storage stage of the probe may further have no noise or heat, and no electromagnetic interference on the numerical control devices. Some embodiments of the disclosure may provide a flatness detection device in which the resetting of the probe does not consume power or generate heat. The flatness detection device may have no electromagnetic interference or noise, and may have improved precision and reliability. Further embodiments of the closure provide a flatness detection device which may complete the flatness detection of various bottom plates with high precision, low energy consumption, and high reliability, and may be particularly applicable to various numerical control devices such as 3D printers.

Specific examples are used in this specification to explain the principles and embodiments of the present invention. The description of the above embodiments is only used to help understand the method of the present invention and its core ideas; meanwhile, for those skilled in the art, depending on the idea of the present invention, both the specific embodiments and the scope of application will change. In summary, the content of this specification should not be construed as a limitation on the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A flatness detection device, comprising a back plate, an electromagnet, a cross beam, a probe, and a limiting frame; wherein:
    the limiting frame and the electromagnet are provided side by side on the back plate;
    the cross beam is located above the limiting frame and the electromagnet;
    the probe vertically penetrates the cross beam and the limiting frame;
    a spring is provided between the cross beam and the electromagnet; and
    the spring is movable in a vertical direction by a guide, the movement being at least one item selected from the group consisting of compression and extension.

2. The flatness detection device according to claim 1, wherein:
    a circuit board is provided between the limiting frame, the electromagnet, and the back plate; and
    a controller is connected to the circuit board.

3. The flatness detection device according to claim 2, wherein:
    a photoelectric sensor is provided on the circuit board;
    a light through-hole is provided on the probe;
    light of the photoelectric sensor is configured to pass through the light through-hole; and
    the photoelectric sensor and the electromagnet are electrically connected to the controller.

4. The flatness detection device according to claim 3, wherein:
    a groove is provided in the middle and upper part of the limiting frame; and
    the photoelectric sensor is located in the groove.

5. The flatness detection device according to claim 1, wherein:
    a sliding groove is provided on a lower end of the probe;
    a bolt is provided below the limiting frame; and
    the bolt is slidable in the sliding groove.

6. The flatness detection device according to claim 1, wherein:
    the back plate is constructed of sheet metal;
    the sheet metal is recessed in a middle area;
    the sheet metal is provided with the limiting frame and the electromagnet;
    the limiting frame and the electromagnet are fixedly connected by bolts; and
    connection holes are provided on opposed sides of the sheet metal.

7. The flatness detection device according to claim 1, wherein:
    the guide is a screw; and
    the screw penetrates the cross beam, the spring, and the electromagnet.

8. The flatness detection device according to claim 1, wherein the cross beam and the limiting frame are connected by a positioning pin.

* * * * *